(12) United States Patent
Kuehne et al.

(10) Patent No.: US 12,124,754 B2
(45) Date of Patent: *Oct. 22, 2024

(54) PORTABLE DEVICE FOR REDUCING SIMULATOR SICKNESS-INDUCED IMPAIRMENTS DURING THE USE OF ELECTRONIC AUGMENTED REALITY GLASSES IN A VEHICLE

(71) Applicant: AUDI AG, Ingolstadt (DE)

(72) Inventors: Marcus Kuehne, Beilngries (DE); Nils Wollny, Munich (DE); Daniel Profendiner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,231

(22) Filed: May 4, 2023

(65) Prior Publication Data
US 2023/0273761 A1    Aug. 31, 2023

Related U.S. Application Data

(63) Continuation of application No. 16/755,391, filed as application No. PCT/EP2018/074581 on Sep. 12, 2018, now Pat. No. 11,687,305.

(30) Foreign Application Priority Data

Oct. 13, 2017   (DE) ..................... 10 2017 218 352.7

(51) Int. Cl.
*G06F 3/14*     (2006.01)
*G02B 27/01*    (2006.01)
(Continued)

(52) U.S. Cl.
CPC ............ *G06F 3/14* (2013.01); *G02B 27/017* (2013.01); *G06F 3/011* (2013.01); *G09G 5/37* (2013.01);
(Continued)

(58) Field of Classification Search
CPC . G06F 3/14; G06F 3/011; G06F 1/163; G02B 27/017; G09G 5/37;
(Continued)

(56) References Cited

U.S. PATENT DOCUMENTS 5,393,137 A    2/1995  Bivens et al.
5,457,745 A    10/1995 Wang
(Continued)

FOREIGN PATENT DOCUMENTS

CN    102667887 A    9/2012
CN    104105614 A    10/2014
(Continued)

OTHER PUBLICATIONS

"MidGard Universal Autohalterung für: Amazon.de: Elektronik", Sep. 12, 2017, printed on Nov. 29, 2018 from www.amazon.de/MidGard-Universal-Autohalterung-KFZ-Getränkehalter-Smartphones-Schwarz/dp/B075LH3CPY/ref=sr_1_4?ie=UTF8&qid=1543499194&sr=8-4&keywords=smartphone+halterung+getränkehalter.
(Continued)

*Primary Examiner* — Antonio A Caschera
(74) *Attorney, Agent, or Firm* — STAAS & HALSEY LLP

(57) ABSTRACT

Movement data characterizing the movement of a vehicle in which electronic smartglasses are used, are sent by a portable apparatus from a data output to the electronic smartglasses for reducing simulator-sickness-induced impairments. The electronic smartglasses display data taking into account the movement data.

17 Claims, 1 Drawing Sheet

(51) Int. Cl.
  *G06F 3/01* (2006.01)
  *G09G 5/37* (2006.01)
  *B60N 3/10* (2006.01)
  *B60R 11/00* (2006.01)
  *B60R 11/02* (2006.01)
  *G06F 1/16* (2006.01)

(52) U.S. Cl.
  CPC ......... *B60N 3/10* (2013.01); *B60R 2011/0003* (2013.01); *B60R 2011/008* (2013.01); *B60R 11/0252* (2013.01); *G06F 1/163* (2013.01); *G09G 2320/0261* (2013.01); *G09G 2340/14* (2013.01); *G09G 2370/00* (2013.01); *G09G 2380/10* (2013.01)

(58) Field of Classification Search
  CPC ....... G09G 2320/0261; G09G 2340/14; G09G 2370/00; G09G 2380/10; B60N 3/10; B60N 3/105; B60N 3/106; B60N 3/108; B60R 11/0252; B60R 2011/0003; B60R 2011/008; H04N 13/332
  See application file for complete search history.

(56) References Cited

U.S. PATENT DOCUMENTS

| | | | |
|---|---|---|---|
| 8,061,670 B1 | 11/2011 | White | |
| 9,274,337 B2 | 3/2016 | Meadows | |
| 11,687,305 B2* | 6/2023 | Kuehne | G02B 27/017 345/672 |
| 2005/0072889 A1 | 4/2005 | Park | |
| 2005/0119800 A1* | 6/2005 | Tanaka | G07C 5/0858 701/1 |
| 2006/0011379 A1 | 1/2006 | Banar et al. | |
| 2011/0282130 A1 | 11/2011 | Krueger | |
| 2015/0097860 A1 | 4/2015 | Alaniz et al. | |
| 2017/0037668 A1 | 2/2017 | Kruedener et al. | |
| 2017/0291639 A1 | 10/2017 | Lavoie et al. | |

FOREIGN PATENT DOCUMENTS

| | | |
|---|---|---|
| CN | 104590167 A | 5/2015 |
| CN | 104977717 A | 10/2015 |
| CN | 105946517 A | 9/2016 |
| CN | 106338828 A | 1/2017 |
| DE | 101 56 219 C1 | 8/2003 |
| DE | 10 2009 033 878 A1 | 1/2011 |
| DE | 10 2012 102 109 A1 | 9/2012 |
| DE | 10 2012 010 404 A1 | 11/2013 |
| DE | 10 2014 220 053 A1 | 7/2015 |
| DE | 10 2015 003 882 A1 | 9/2016 |
| EP | 2 933 707 A1 | 10/2015 |
| JP | 2009-251687 | 10/2009 |
| JP | 2015-204616 | 11/2015 |
| WO | 2017/031273 A1 | 2/2017 |

OTHER PUBLICATIONS

International Search Report issued on Dec. 7, 2018 in Corresponding International Patent Application No. PCT/EP2018/074581.
English translation by WIPO of International Preliminary Report on Patentability dated Jan. 28, 2020 for International Application No. PCT/EP2018/074581, 5 pages.
Japanese Office Action dated Feb. 16, 2021 from Japanese Application No. 2020-520630, 3 pages.
Chinese Office Action dated Jun. 2, 2021 from Chinese Application No. 201880066148.1, 10 pages.
German Office Action dated Dec. 28, 2022 for German Application No. 10 2017 218 352.7.
U.S. Office Action dated Jun. 7, 2021 for U.S. Appl. No. 16/755,391.
U.S. Office Action dated Oct. 26, 2021 for U.S. Appl. No. 16/755,391.
U.S. Advisory Action dated Dec. 29, 2021 for U.S. Appl. No. 16/755,391.
U.S. Office Action dated Feb. 7, 2022 for U.S. Appl. No. 16/755,391.
U.S. Office Action dated Apr. 26, 2022 for U.S. Appl. No. 16/755,391.
U.S. Advisory Action dated Jul. 13, 2022 for U.S. Appl. No. 16/755,391.
U.S. Office Action dated Aug. 9, 2022 for U.S. Appl. No. 16/755,391.
U.S. Office Action dated Dec. 22, 2022 for U.S. Appl. No. 16/755,391.
U.S. Notice of Allowance dated Apr. 5, 2023 for U.S. Appl. No. 16/755,391.
U.S. Appl. No. 16/755,391, filed Apr. 10, 2020, Marcus Kuehne, AUDI AG.

* cited by examiner

PORTABLE DEVICE FOR REDUCING SIMULATOR SICKNESS-INDUCED IMPAIRMENTS DURING THE USE OF ELECTRONIC AUGMENTED REALITY GLASSES IN A VEHICLE

CROSS REFERENCE TO RELATED APPLICATIONS

This application is a continuation of U.S. application Ser. No. 16/755,391, filed on Apr. 10, 2020 which is a U.S. national stage of International Application No. PCT/EP2018/074581, filed on Sep. 12, 2018. The International Application claims the priority benefit of German Application No. 10 2017 218 352.7 filed on Oct. 13, 2017. Both the International Application and the German Application are incorporated by reference herein in their entirety.

BACKGROUND

Described below is a portable apparatus for reducing simulator-sickness-induced impairments when using electronic smartglasses in a vehicle and a display system for a vehicle, using the portable apparatus and at least one set of electronic smartglasses.

Immersive technologies will be used in vehicles more and more in future. For example, vehicle occupants will consume conventional media content, such as movies, console games and the like during the journey or will surf the Internet, for example, by wearing a set of virtual reality glasses or a set of augmented reality glasses. The problem of what is known as simulator sickness can arise in this context. Simulator-sickness-induced impairments, that is to say symptoms that can be traced back to simulator sickness, typically occur in the form of dissonances between sensory impressions with respect to the visually perceived stimuli and moving forces perceived by way of the organ of equilibrium. When using electronic smartglasses in moving vehicles, the problem that the contents displayed using the electronic smartglasses do not fit the real movement perceived by the respective person may arise.

A suitable way to eliminate or alleviate this effect of simulator-sickness-induced impairments is to additionally display contents corresponding to the movement of the vehicle using such electronic smartglasses.

For example, DE 101 56 219 C1 discloses a method and an apparatus for reducing kinetose impairments, to which simulator sickness also belongs. Provision is made here for a vehicle's own movements to be captured using sensors, wherein the sensors are attached for example on the side of the vehicle or are provided in the form of portable detectors on the body of a passenger. Using a head-mounted display, the own movements of the vehicle, among other things, which have been captured using the sensors are then visualized.

US 2015/0097860 A1 describes a method with which nausea is intended to be prevented from arising in a vehicle occupant when wearing electronic smartglasses in the vehicle. Provision is made here for movement data characterizing the vehicle's own movement to be provided using vehicle-side systems such that the data can be visualized using electronic smartglasses.

Additionally, US 2011/0282130 A1 discloses electronic smartglasses with integrated sensors, which can be used to reduce simulator-sickness-induced impairments.

SUMMARY

Described below is a particularly simple solution with which simulator-sickness-induced impairments when using electronic smartglasses in a vehicle can be reduced.

The portable apparatus for reducing simulator-sickness-induced impairments when using electronic smartglasses in a vehicle has a data output configured to transmit movement data characterizing an own movement of the vehicle to the electronic smartglasses. Consequently, a type of electronic box or a small hardware box is provided in the form of the portable apparatus, which box can collect movement data and transmit them to the electronic smartglasses via the data output.

The electronic smartglasses as such do not require any sensors to capture the own movement of the vehicle. In addition, it is possible, independently of the vehicle, for the portable apparatus to be carried along at all times and to be used to reduce or entirely eliminate simulator-sickness-induced impairments when the electronic smartglasses are used during the journey with the vehicle. A user of the electronic smartglasses thus merely needs to carry the portable apparatus with them and to place it somewhere in the vehicle if the user wishes to use the electronic smartglasses while driving with the vehicle.

Due to the fact that the portable apparatus can transmit movement data characterizing the own movement of the vehicle to the electronic smartglasses via the data output of the apparatus, the smartglasses can display corresponding contents for reducing simulator-sickness-induced symptoms based on the movement data of an own movement of the vehicle, which are transmitted by way of the portable apparatus, during the use in the vehicle. Using the portable apparatus, it is thus possible in a simple manner to reduce or even completely eliminate simulator-sickness-induced impairments when using electronic smartglasses in a vehicle.

One advantageous embodiment makes provision for the data output to have a wireless and/or cable-bound interface for transmitting data to the electronic smartglasses. Depending on the electronic smartglasses used and on the data interfaces provided thereon, it is thus possible to select the appropriate data transmission path, be it wireless and/or cable-bound.

A further advantageous embodiment makes provision for the portable apparatus to have a data input, which is configured to receive the movement data from the vehicle. In this way, for example, sensors that are already present on-board the vehicle can be used to capture the own movement of the vehicle, wherein access to the vehicle-side collected movement data can be provided via the data input of the portable apparatus. For example, the data input can likewise have a wireless and/or cable-bound interface for the data transmission of the movement data from the vehicle to the portable apparatus. For example, it is thus possible that the portable apparatus can be connected to or plugged into what is known as an OBD interface, that is to say an on-board diagnostics interface, of the vehicle by way of its data input. If it is possible on the part of the vehicle, the data input can for example also receive the movement data from the vehicle in wireless fashion. If the vehicle is able to provide movement data relating to its own movement, these data can be used in a simple manner by way of the data input of the portable apparatus.

In a further advantageous configuration, provision is made for the portable apparatus to have a sensor device for capturing at least some of the movement data characterizing the own movement of the vehicle. The portable apparatus can have one or more sensors that can be part of the sensor device. The sensors can be, for example, acceleration sensors or other sensors by way of which the own movement of the vehicle can be captured by way of the portable apparatus itself. Independently of what sensor system is installed in the vehicle, the portable apparatus itself can thus capture the own movement of the vehicle.

A further advantageous embodiment makes provision for the portable apparatus to be embodied in the shape of a can. In this way, the portable apparatus can be placed particularly easily for example in a drinks holder of the vehicle. The portable apparatus thus may have a shape or form factor such that the portable apparatus can be stowed away particularly easily and securely in the vehicle. If the portable apparatus has the shape of a can, this can be ensured in a particularly simple manner.

In a further advantageous configuration, provision is made for the portable apparatus to have an interface for an electrical system of the vehicle and/or to be designed for battery operation for the supply of power. In this way, the power supply of the portable apparatus can be ensured in a simple manner.

In accordance with a further advantageous embodiment, provision is made for the portable apparatus to have mechanics for wedging and/or clamping the apparatus in a vehicle-side drinks holder. The mechanism for wedging and/or clamping the apparatus can of course also be designed for other receiving regions in the vehicle and does not have to be limited to a vehicle-side drinks holder. Where the portable apparatus is adapted to the vehicle-side drinks holder, provision can be made for the mechanism to have a screw mechanism with which a region of the portable apparatus that is adapted to the drinks holder is able to be widened. By actuating the screw mechanism, a vehicle occupant can easily fix the portable apparatus in or to the drinks holder and release the fixation again. The screw mechanism can here be manually actuable or electrically actuable. Alternatively or in addition, it is also possible for the mechanism to have a push-push locking mechanism with which a region of the portable apparatus that is adapted to the drinks holder is able to be widened by compressing it once and to be narrowed again by compressing it a second time. The region of the portable apparatus that is adapted to the drinks holder may be made from a rubber-type or other elastic material. By actuating the push-push locking mechanism, a user can very easily widen the elastic, e.g., rubber-type region of the portable apparatus so that the region is clamped in the drinks holder. If the portable apparatus is to be removed again from the vehicle, the push-push locking mechanism merely needs to be actuated with another push.

The display system for a vehicle includes the portable apparatus, described above, or an advantageous embodiment of the portable apparatus and also at least one set of electronic smartglasses for displaying a virtual reality and/or an augmented reality. The electronic smartglasses are configured to display, based on the movement data transmittable using the portable apparatus, contents corresponding to an own movement of the vehicle for reducing simulator-sickness-induced symptoms when using the electronic smartglasses in the vehicle. For example, the electronic smartglasses can display a structure moving with a direction vector of the vehicle in a peripheral display region. Other contents that visualize the own movement of the vehicle are of course also implementable based on the movement data so as to prevent the occurrence of the simulator sickness in a wearer of the electronic smartglasses while driving with the vehicle or to at least significantly reduce such impairments.

BRIEF DESCRIPTION OF THE DRAWINGS

Further advantages, features and details will become apparent from the following description of exemplary embodiments and with reference to the drawings. The features and combinations of features mentioned above in the description and the features and combinations of features shown alone in the description of the figures below and/or in the figures are able to be used not only in the respectively specified combination but also in other combinations or on their own without departing from the scope of the invention. In the drawings.

DETAILED DESCRIPTION

Figure 1:
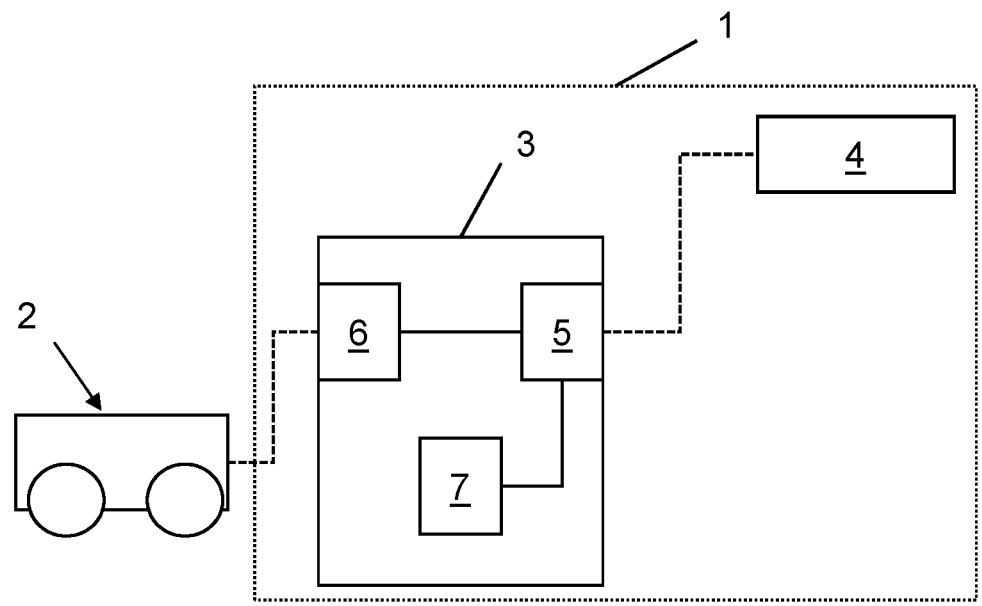
FIG. 1 is a schematic illustration of a display system for a vehicle with a portable apparatus for reducing simulator-sickness-induced impairments when using electronic smartglasses in a vehicle.

Reference will now be made in detail to the preferred embodiments, examples of which are illustrated in the accompanying drawings. In the figures, identical or functionally identical elements have been provided with the same reference characters.

A display system 1 for a vehicle 2 is shown in FIG. 1 in a highly schematic illustration. The display system 1 includes a portable apparatus 3 for reducing simulator-sickness-induced impairments when using electronic smartglasses 4 in the vehicle 2. The electronic smartglasses 4 can be virtual reality glasses or augmented reality glasses. The electronic smartglasses 4 can also be designed to display both a virtual reality and an augmented reality.

The portable apparatus 3 may have the shape of a drinks can, with the result that the portable apparatus 3 can be accommodated easily and in a crash-proof manner for example in a drinks holder of the vehicle 2, which is not illustrated in more detail here. In addition, the portable apparatus 3 can also have a mechanism, which is not illustrated in more detail here, for wedging and/or clamping the portable apparatus 3 in the vehicle-side drinks holder.

The mechanism can be formed for example by a screw mechanism, with which a region of the portable apparatus 3 that is adapted to the drinks holder and is not illustrated here in more detail is able to be widened and narrowed. Alternatively or in addition, it is also possible for the mechanism to have a push-push locking mechanism with which a region of the portable apparatus 3 that is adapted to the drinks holder is able to be widened by compressing it once and to be narrowed again by compressing it a second time. In this context, provision may be made for example for the portable apparatus 3 in the region that is adapted to the drinks holder to be made from rubber or to have a rubberized region that is able to be widened and narrowed by actuating the push-push locking mechanism. In this way, the portable apparatus 3 can be fixed in the drinks holder and be removed therefrom again particularly easily and practicably.

The portable apparatus 1 for reducing simulator-sickness-induced impairments when using the electronic smartglasses in the vehicle 2 has a data output 5, which is configured to transmit movement data characterizing an own movement of the vehicle 2 to the electronic smartglasses 4. The data output 5 can here have both a wireless and also a cable-bound interface for data transmission to the electronic smartglasses 4. The smartglasses 4 themselves have a data interface that is compatible with the data output 5 and is not illustrated in more detail here.

In the presently demonstrated case, the portable apparatus 3 has a data input 6, which is designed to receive the movement data from the vehicle 2. The data input 6 can here have both a wireless and also a cable-bound interface for data transmission of the movement data from the vehicle 2. For example, the data input 6 can be connected to an OBD interface of the vehicle 2 to in this way access movement data of the vehicle 2 that were captured using on-board sensors. If it is possible on the part of the vehicle to also provide the movement data wirelessly, the movement data can also be transmitted wirelessly to the data input 6.

In addition, the portable apparatus 3 also has a sensor device 7 for capturing at least some of the movement data characterizing the own movement of the vehicle 2. The sensor device 7 can have, for example, one or more acceleration sensors with which the own movement of the vehicle 2 can be captured. It is thus also possible using the portable apparatus 3 to capture the own movement of the vehicle 2 completely independently of any sensor system that is or is not installed in the vehicle 2. The sensor device 7, in turn, is in data communication with the data output 5.

Irrespective of how the own movement of the vehicle 2 is collected, movement data characterizing the own movement of the vehicle 2 can be transmitted to the electronic smartglasses 4 via the data output 5 of the portable apparatus 3.

Figure 2:
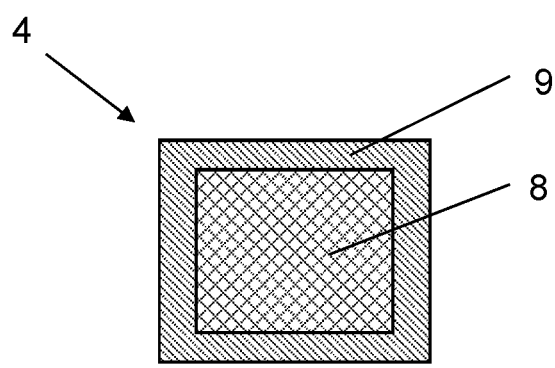
FIG. 2 is a highly schematic illustration of the electronic smartglasses while these are used to display virtual content in a central region and content corresponding to movement of the vehicle in a peripheral region.

FIG. 2 highly schematically illustrates the electronic smartglasses 4, wherein a virtual reality and/or an augmented reality can be displayed in the large central display region 8. In order to reduce or prevent simulator-sickness-induced impairments in a wearer of the electronic smartglasses 4 while driving with the vehicle 2, the electronic smartglasses 4 are designed to display contents corresponding to an own movement of the vehicle 2 in a peripheral display region 9 based on the movement data that can be transmitted using the portable apparatus 3.

For example, a film is displayed in the central display region 8, while a variety of structures that move according to the own movement of the vehicle 2 can be displayed in the peripheral display region 9. The wearer of the electronic smartglasses 4 thus perceives the structures in their peripheral field of view. Consequently, the wearer of the electronic smartglasses 4 perceives visual stimuli corresponding to the own movement of the vehicle 2 at least peripherally. The visual stimuli then in turn coincide with the perception of the wearer's sense of equilibrium. Consequently, simulator-sickness-induced impairments can be significantly reduced or be completely prevented when a user uses the electronic smartglasses 4 while driving with the vehicle 2.

The representations of the contents corresponding to the own movement of the vehicle 2 in the peripheral display region 9 are to be understood to be purely exemplary. In principle, the contents corresponding to the own movement of the vehicle 2 can be displayed in any display regions of the electronic smartglasses 4 to reduce or completely eliminate simulator-sickness-induced impairments when using the electronic smartglasses 4 in the vehicle 2.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A portable apparatus for reducing simulator-sickness-induced impairments when using electronic smartglasses in a vehicle having an interior, comprising:
   an enclosure having a substantially cylindrical shape;
   a clamping mechanism configured to interact with a surface of the interior of the vehicle to at least one of wedge and clamp the portable apparatus in the interior of the vehicle; and
   a data output configured to transmit movement data characterizing movement of the vehicle to the electronic smartglasses.

2. The portable apparatus as claimed in claim 1, wherein the data output includes at least one of a wireless interface and a cable-bound interface providing transmission of the movement data to the electronic smartglasses.

3. The portable apparatus as claimed in claim 2, further comprising a data input configured to receive the movement data from the vehicle.

4. The portable apparatus as claimed in claim 3, wherein the data input includes at least one of a wireless interface and a cable-bound interface receiving transmission of the movement data from the vehicle.

5. The portable apparatus as claimed in claim 1, further comprising a sensor device configured to capture at least some of the movement data characterizing the movement of the vehicle.

6. The portable apparatus as claimed in claim 1, wherein the vehicle has an electrical system, and
   wherein the portable apparatus further comprises at least one of an electrical interface to the electrical system of the vehicle and a battery.

7. The portable apparatus as claimed in claim 6, wherein the vehicle has at least one drinks holder, and
   wherein the mechanism is configured to at least one of wedge and clamp the portable apparatus in one of the at least one drinks holder.

8. The portable apparatus as claimed in claim 7, wherein the mechanism includes a screw mechanism configured to widen a region of the portable apparatus adapted to fit within the one of the at least one drinks holder.

9. The portable apparatus as claimed in claim 7, wherein the mechanism includes a push-push locking mechanism configured to widen a region of the portable apparatus adapted to fit within the one of the at least one drinks holder by compressing the push-push locking mechanism once and to narrow the region by compressing the push-push locking mechanism a second time.

10. A display system for a vehicle having an interior, comprising:
    at least one set of electronic smartglasses configured to display at least one of a virtual reality and an augmented reality, including contents corresponding to movement of the vehicle based on movement data; and
    a portable apparatus having a substantially cylindrical shape and a clamping mechanism configured to interact with a surface of the interior of the vehicle to at least one of wedge and clamp the portable apparatus in the interior of the vehicle, the portable apparatus configured to reduce simulator-sickness-induced symptoms of a user of the electronic smartglasses in the vehicle, by transmitting the movement data to the electronic smartglasses.

11. The display system as claimed in claim 10, wherein the portable apparatus further comprises a data input configured to receive the movement data from the vehicle.

12. The display system as claimed in claim 11, wherein the data input includes at least one of a wireless interface and a cable-bound interface receiving transmission of the movement data from the vehicle.

13. The display system as claimed in claim 10, further comprising a sensor device configured to capture at least some of the movement data characterizing the movement of the vehicle.

14. The display system as claimed in claim 13, wherein the vehicle has an electrical system, and
wherein the portable apparatus further comprises at least one of an electrical interface to the electrical system of the vehicle and a battery.

15. The display system as claimed in claim 14, wherein the vehicle has at least one drinks holder, and
wherein the mechanism is configured to at least one of wedge and clamp the portable apparatus in one of the at least one drinks holder.

16. The display system as claimed in claim 15, wherein the mechanism includes a screw mechanism configured to widen a region of the portable apparatus adapted to fit within the one of the at least one drinks holder.

17. The display system as claimed in claim 15, wherein the mechanism includes a push-push locking mechanism configured to widen a region of the portable apparatus adapted to fit within the one of the at least one drinks holder by compressing the push-push locking mechanism once and to narrow the region by compressing the push-push locking mechanism a second time.

* * * * *